United States Patent [19]

Methe

[11] Patent Number: 5,421,001
[45] Date of Patent: May 30, 1995

[54] COMPUTER METHOD AND APPARATUS FOR A TABLE DRIVEN FILE INTERFACE

[75] Inventor: Edward G. Methe, Boston, Mass.

[73] Assignee: Wang Laboratories, Inc., Lowell, Mass.

[21] Appl. No.: 877,409

[22] Filed: May 1, 1992

[51] Int. Cl.⁶ .............................................. G06F 5/00
[52] U.S. Cl. .................................... 395/500; 395/600;
364/DIG. 1; 364/280.4
[58] Field of Search .............................. 395/500, 600;
364/419.02, 419.07

[56] References Cited

U.S. PATENT DOCUMENTS

| | | | |
|---|---|---|---|
| 4,498,147 | 2/1985 | Agnew et al. | 395/600 |
| 4,559,614 | 12/1985 | Peek et al. | 395/600 |
| 4,604,710 | 8/1986 | Amezcua et al. | 395/600 |
| 5,021,995 | 6/1991 | Quint et al. | 395/600 |
| 5,033,009 | 7/1991 | Dubnoff | 364/523 |
| 5,058,000 | 10/1991 | Cox et al. | 395/600 |
| 5,119,465 | 6/1992 | Jack et al. | 395/500 |
| 5,212,770 | 5/1993 | Smith et al. | 395/155 |

FOREIGN PATENT DOCUMENTS 0408132  1/1916  European Pat. Off. .

OTHER PUBLICATIONS

Wang InfoSharer, Windows InfoSharer User's Guide, Release 1.0, 1st Edition, pp. 8-1-8-13, Jun. 1991.

*Primary Examiner*—Thomas G. Black
*Assistant Examiner*—John C. Loomis
*Attorney, Agent, or Firm*—Kenenth L. Milik

[57] ABSTRACT

An interface between different file formats employs a table for parsing component parts of each file format. The table cross references or categorizes each of the different file formats according to file type from a predefined set of file types. For each file type, the table provides an indication and description of each component part of a file of that type. Each component part description of the table is in a common format. Thus, the present invention method and apparatus employs a table driven parser which utilizes a common form of representation for defining multiple file formats.

6 Claims, 9 Drawing Sheets

COMPUTER METHOD AND APPARATUS FOR A TABLE DRIVEN FILE INTERFACE

BACKGROUND OF THE INVENTION

In a computer system, user programs called applications are executed by a digital processor. The digital processor may be for example a mainframe, a host processor of a network, a stand-alone PC and the like. The applications may be for example spreadsheet programs and word processing programs, to name a few. Execution of the different applications generates files of different file formats. That is, a word processing application generates files of a text storage format while a spreadsheet application generates files of another format, and among different word processing applications different text storage formats are employed for the generated files.

In order for one application (a requesting application) to access files of foreign file formats, either (a) the requesting application must know the file format of the desired files, or (b) the requesting application must use an interface which accesses the desired files according to the foreign file format thereof. As a result, the proper interface must be available to a requesting application which means that a variety of interfaces must be available for a requesting application to access files of a variety of foreign file formats.

One solution to availability of various interfaces has been to include individual open, close, read, and write access routines for each of specific file formats in an interface. For different file formats outside of those specified for an interface, the appropriate open, close, read, and write routines are developed and added to the interface upon user/customer request. This requires development time to make the necessary changes to the interface for the additional/new file formats. In turn, the longer development time is, the longer is the turnaround time which leads to customer dissatisfaction.

Thus, there exists a need for improvements in interfacing among different file formats.

SUMMARY OF THE INVENTION

The present invention provides an interface which solves the problems of the prior art. In particular, the present invention provides an interface which reduces development time for additional or new file formats supported by an interface.

The Applicant of the present invention has discovered that with such a variety of interfaces, there is considerable redundancy in respective open, close, read, and write access routines for different file formats. This is especially true with interfaces that translate among certain file formats, for example among the different text storage formats generated by different word processing applications. In order to enable applications to access files of different foreign formats and to take advantage of such redundancy in such a way as to reduce development time for adding capabilities for accessing new file formats, the Applicant has developed a method and means which employs a common form of representation for defining multiple file formats. This common method and means is the basis for the present invention table driven parser.

As used herein the term "parser" refers to a method and means which determines and interprets component parts of a file format.

Specifically, the present invention is directed to computer apparatus comprising a table having for each of different file formats an entry indicating components parts of the file format, and processor means coupled to the table for interfacing between at least one application and files of different file formats. For a desired file having a respective file format which is foreign to a subject application, the processor means accesses the table to parse the desired file according to component parts indicated in the entry of the table corresponding to the respective file format. In turn, the processor means enables the subject application to access the desired file.

In accordance with one aspect of the present invention, the table cross references each of different file formats according to a different file type, different files being assigned a respective file type. That is, the table categorizes the different file formats according to file type (from a predefined set of file types). For each file type, the table provides an indication and description of each component part of a file of that type. Further the table is organized such that each component part description is in a common format.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
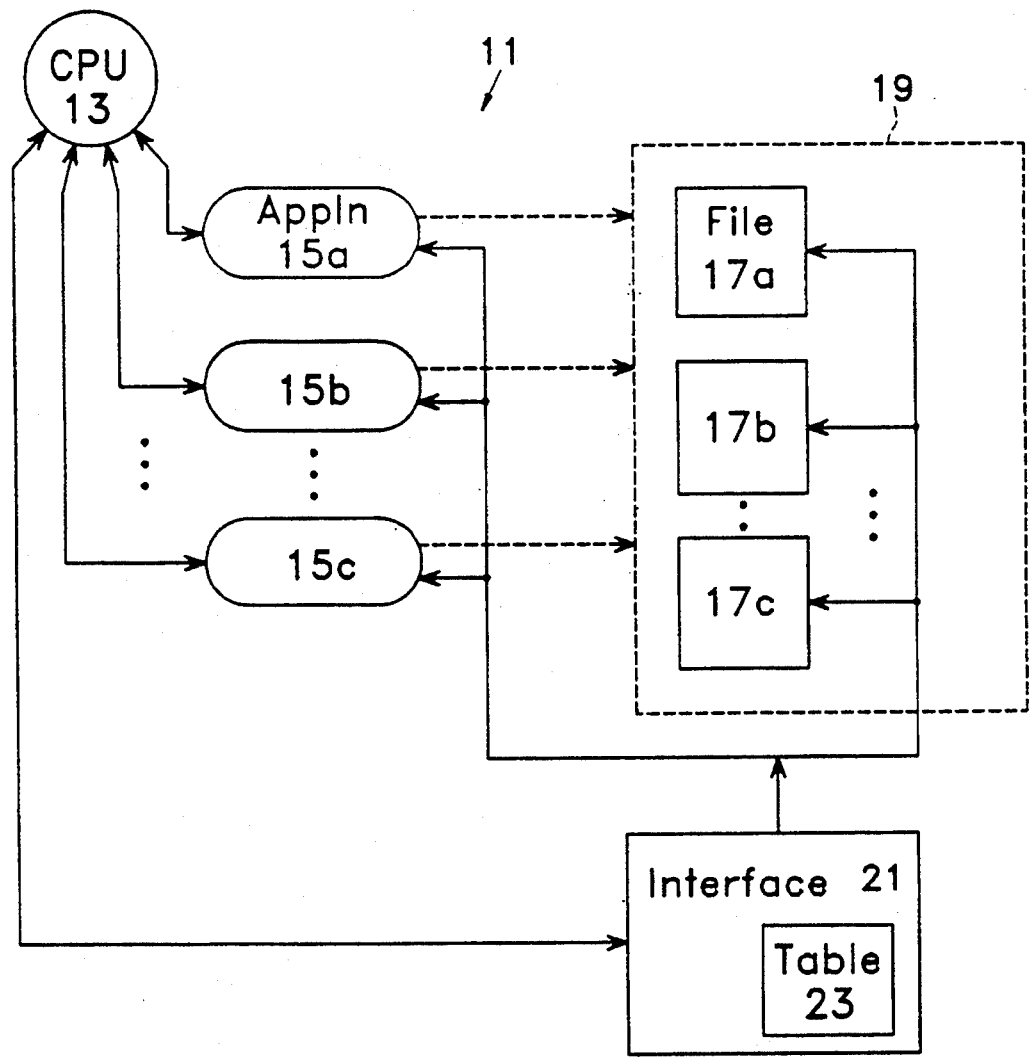
FIG. 1 is a schematic illustration of a computer system embodying the present invention.

Referring to FIG. 1 is an illustration of a digital processor embodiment of the present invention. In a digital processor 11 the CPU (Central Processing Unit) 13 executes various applications 15 in main memory. Throughout execution of applications 15 files 17 are generated. Under the direction of the application 15 generating the files 17, the CPU 13 stores each file 17 in storage memory 19. Each file 17 is formatted according to its respective application 15 which generated the file. As a result, different files 17 stored in storage memory 19 have different file formats.

Upon an application, for example application 15a, accessing a foreign file, i.e., a file 17b, c having a file format different than that of the file 17a generated by application 15a, the CPU 13 utilizes an interface 21 of the present invention. The interface 21 contains one set of open, close, read and write access routines which in common allow access to a variety of different file formats. More accurately, the interface 21 refers to a table 23 which specifies the different characteristics of different file formats. Thus, interface 21 reads from table 23 the details of a desired file format and utilizes those details to open the desired file 17 and retrieve data therefrom for the requesting application 15.

Figure 2:
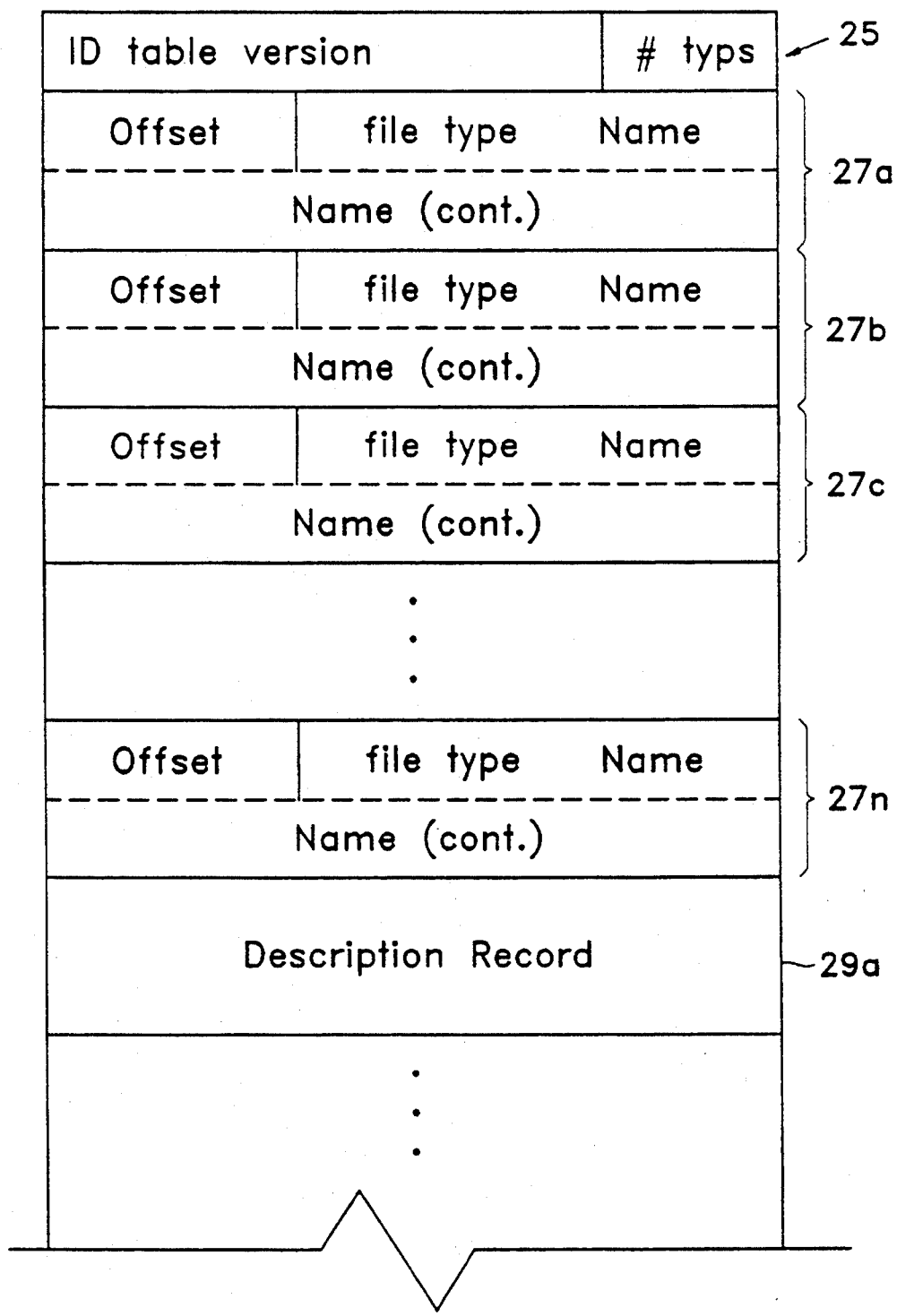
FIG. 2 is a block diagram of a parser table employed in the embodiment of FIG. 1.

Thus, table 23 specifies how to extract data for each of the different file formats represented in the table. This is accomplished in the preferred embodiment of table 23 as illustrated in FIG. 2 and discussed next. Briefly, by way of overview, in the preferred embodiment of the present invention the different file formats represented in table 23 are categorized according to file type (there being a set of predefined file types). For each file type, table 23 provides an indication of component parts and a description of each component part. Further, table 23 is organized such that each description is in a common format. That is from one file format description to the next, a common format or "metalanguage" is utilized.

As a result, interface 21 serves as a table driven file parser which parses the source format file into component parts according to the metalanguage description of the source file format as stored in the table 23. The component parts are then assembled directly into the target format file according to the metalanguage description of the target file format also stored in the table 23.

This approach provides ease in adding new file format descriptions in the table 23 and obviates the need to develop a complete translator from a newly supported file format. Instead, only the metalanguage description of the new file format need be developed and added to the table 23.

As illustrated in FIG. 2, table 23 is organized with a header record 25 followed by one entry record 27 for each file type and description records 29 corresponding to entry records 27.

The header record 25 is preferably 10 bytes long. The first 8 bytes provide an identification and/or version number of the table 23. The remaining 2 bytes of the header record 25 provide the number of file types represented in the table 23.

Each entry record 27 is preferably 20 bytes long. The first 4 bytes provide an indication of the offset from the beginning of the table 23 to the description record 29 corresponding to the file type specified in the name portion of the entry record 27. The name portion occupies the remaining 16 bytes of the entry record 27. Thus, the series of entry records 27 in table 23 serve as the location indicating and cross referencing members of the table which provide indications of memory locations of description records 29 and the respective file type to which each description record corresponds.

Figure 3A:
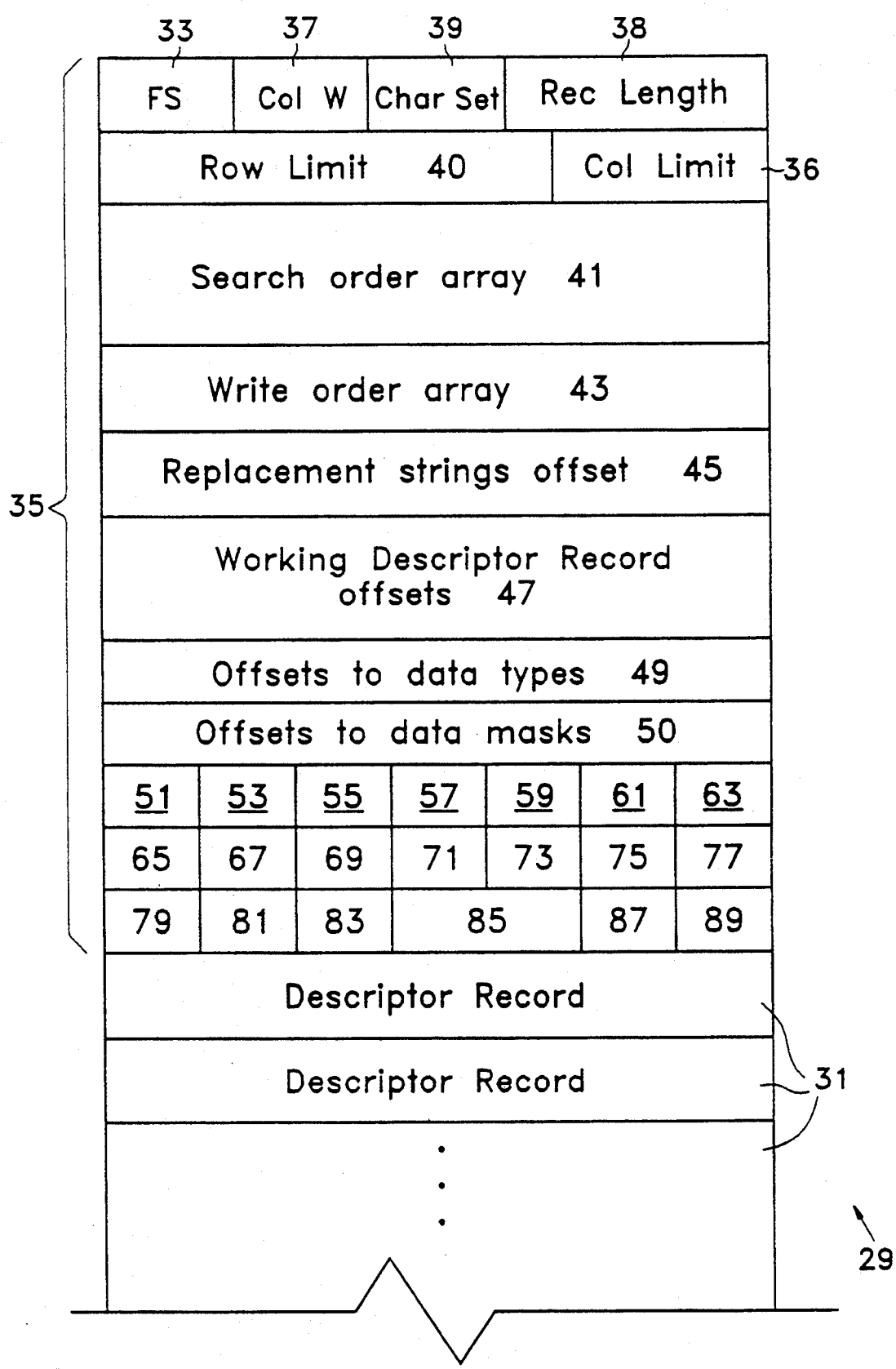
FIGS. 3a, 3b, 3c, 3d, 3e, and 3f, are block diagrams of Working Descriptor Records of the parser table of FIG. 2.

Each description record 29 is variable in length but is arranged according to a common format as follows and illustrated in FIG. 3a. In a preferred embodiment, a first portion 35 of a description record 29 is 359 bytes long and indicates various features of the file type corresponding to the description record 29. Following the first portion 35 is a series of descriptor records 31 for specifying text, numeric, repeat and other character sequences which identify and describe the subject file format.

In particular, the first byte of first portion 35 is a format switch 33. In the format switch 33, the lowest order bit is set to one to specify that text is enclosed within justification letters. That bit is set to zero if text in the corresponding file format is not enclosed within justification letters. The next order bit in format switch 33 is set to one to indicate that a PC file is involved, and is set to zero otherwise. The next order bit is set to one to indicate that data records can be inserted into the file of this type, and is set to zero otherwise in which case records will be appended to an existing file of this type. The next order bit is set to one to indicate that the file format has fixed length records, and is set to zero otherwise. The next order bit is set to one to indicate that the involved file format contains compressed records, and is set to zero otherwise. The next order bit specifies whether or not a label is enclosed within justification characters. The next order bit is set to specify whether or not the cells in the subject file could be out of row-column order.

The next byte 37 of the description record 29 indicates the default column width. The next byte 39 of the description record 29 indicates the character set of the involved file format. The next two bytes 38 of description record 29 indicates the maximum record length. The next four bytes of description record 29 indicate a row limit 40 which is the largest row for the involved file type. The next two bytes of record 29 indicate a column limit 36 which is the largest column for the file type.

Following the above described first 11 bytes of the description record 29 is a 32 byte array 41 indicating the order in which working descriptor records 31 (i.e., the parts following the first part 35 of the description record 29 and described below) are to be searched. The last entry in the search order array 41 is assigned the hex value FF to signify the end of the search order array 41.

The next 8 bytes in the first part 35 of the description record 29 is an array 43 which indicates a write order. This is the order in which the working descriptor records 31 are to be written. The last entry in the write order array 43 is assigned the hex value FF to signify the end of the array 43.

The next 40 bytes in description record 29 indicate the number of bytes from the beginning of the first description record 29a of table 23 to replacement strings. On input, the replacement strings enable file specific characters to be replaced with desired characters, and other characters to be replaced by file specific characters on output. The indicated number of bytes (block 45 FIG. 3a) provide the offset to the beginning of the replacement string (i.e., string to be replaced), the end of the replacement string, the beginning of a change substitute string, the end of a change substitute string, etc.

The next 124 bytes in the first part 35 of description record 29 indicate offset positions from the beginning of the description record 29 to working descriptor records 31 for describing the file format of the file type corresponding to the description record 29. The offsets for these working descriptor records 31 appear at 47 (FIG. 3a) of the description record 29 in the following order Header_Record
Format_Record
Range_Record
Column_Width_Record
BOD_Record (Beginning of Data_Record)
BOR_Record (Beginning of Row_Record)
Data_Delimiter
Empty_Cell_Record
Integer_Record
Decimal_Record
Text_Record
Label_Record
Date_Record
Time_Record Formula_Record
Left_Justify
Center
Right_Justify
Repeat_char
EOR_Record (End of Row_Record)
EOF_Record (End of File_Record)
Extra_1
Extra_2
Extra_3
Extra_4
Extra_5
Password
Format_Mask_Record
Format_Index_Record The format of each of these working descriptor records 31 is described later.

In the following 88 bytes (at 49 FIG. 3a) in the first part 35 of description record 29 are the number of bytes offset from the beginning of the description record 29 to the working descriptor record 31 or part thereof defining the various data types of the file format of the corresponding file type. The data type offsets 49 are arranged in the following order of data types.

DX_BYTE_INT
DX_UBYTE_INT
DX_SHORT_INT
DX_USHORT_INT
DX_LONG_INT
DX_ULONG_INT
DX_SHORT_FLOAT
DX_LONG_FLOAT
DX_INT_TEXT
DX_FLOAT_TEXT
DX_SCI_TEXT
DX_BINARY_TEXT
DX_OCTAL_TEXT
DX_HEX_TEXT
DX_TEXT
DX_LABEL
DX_FORMULA

The next 32 bytes (at 50 in FIG. 3a) indicate the offsets to records which describe data formatting masks. The offsets appear in the following order:

General numeric format (variable # of decimals)
No decimals
Monetary with no decimals
Numeric with 2 decimals
Monetary with 2 decimals
Percent with no decimals
Percent with 2 decimals
Scientific notation
Time
Date The next byte 51 of the first 35 part of the description record 29 indicates the number of bytes offset into each record for the column number of the file type. This offset information comes from the Format_Record working descriptor record 31 of description record 29.

The next byte 53 of description record 29 indicates the column number format type. That is, the type in which the column number is stored, as indicated from Numeric-Variable information stored in a working descriptor record 31.

The next byte 55 of the first part of description record 29 indicates the default minimum number of characters output for the column number. The next byte 57 indicates the number of recognized digits to the right of the decimal point where the column number format type is indicated as decimal data.

The next two bytes in description record 29 is a column adjustment 59. The value of this column adjustment is used to adjust the default first column in a positive or negative direction. The default first column is zero.

The next byte 61 in description record 29 indicates the number of bytes offset within each record for the row number of the file type. This information comes from the Format_Record working descriptor record 31 mentioned above.

The next byte 63 in the first part of description record 29 indicates the row number format type. That is, the type in which the row number is stored as indicated from the Numeric-Variable information of a working descriptor record 31. The next byte 65 of description record 29 indicates the default minimum number of characters output for the row number. The next byte 67 indicates the number of recognized digits to the right of the decimal point where the row number format type was decimal data.

The next two bytes 69 of description record 29 indicate a row adjustment which is a value used to adjust the default first row in a positive or negative direction. The default first row is preferably set to zero.

The next byte 71 of the description record 29 indicates the number of bytes offset from the beginning of the description record 29 to the address holding the record length (i.e., the length of the record of the subject file type). This address information comes from the working descriptor record 31 for the Format_Record mentioned above. The next byte 73 indicates the record length format type, that is the type in which the record length is stored as indicated from the Numeric-Variable information of a working descriptor record 31.

The next byte 75 indicates the default minimum number of characters output for the record length. The next byte 77 of description record 29 indicates the number of digits to the right of the decimal point where the record length format type is indicated as decimal data.

The next two bytes of description record 29 indicate a record length adjustment 79. The value of this adjustment variable is used to adjust the default record length in a positive or negative direction.

The next byte 81 in the description record 29 indicates the number of bytes offset from the beginning of the description record 29 to the address (i.e., record) holding the cell display width. This address information comes from the working descriptor record 31 for the Format_Record mentioned above.

The next byte 83 of the first part 35 of description record 29 indicates the cell width format type. This is the type in which the cell width is stored as indicated from the Numeric-Variable information of a working descriptor record 31.

The next byte 85 of description record 29 indicates the default minimum number of characters output for the cell width. The next byte 87 indicates the number of digits to the right of the decimal point where the cell width format type is indicated as decimal data.

The last two bytes 89 of the first part of description record 29 indicates a cell width adjustment. This adjustment variable is used to adjust the cell width default in a positive or negative direction. Preferably the default cell width is 9 or the length of the string being output whichever is greater.

As mentioned above, in the remaining parts of the description record 29 are a series of working descriptor records 31 for the Header_Record, Format_Record, Range_Record, etc. listed at 47 in the first part of the description record 29. Depending on the content of the working descriptor record 31, the record follows one of the following record structures illustrated in FIGS. 3b-3f.

In the preferred embodiment, descriptor records 31 of FIGS. 3b-3f are generated by a table compiler which converts working file descriptions into table 23 records. Details of the working file descriptions are included in the discussion of the record structures of FIGS. 3b-3f. Examples of the working file descriptions are given in the attached Appendix. In sum, a visual file of working file descriptions is initially used in the description of a file format (e.g., by a Software Engineer). The visual file is then "compiled" by the table compiler to generate table 23 and in particular working descriptor records 31 in the structures of FIGS. 3b-3f.

Figure 3B:
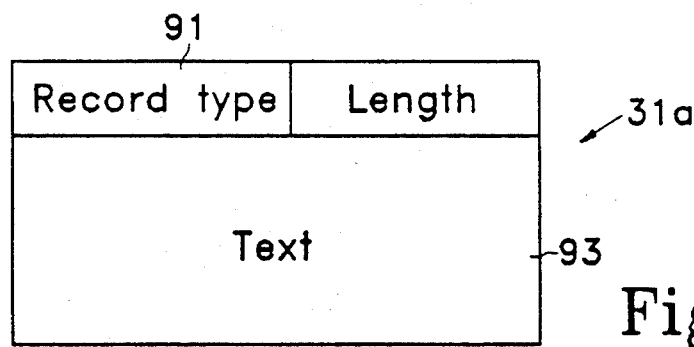

Referring to FIG. 3b, for a working descriptor record 31 containing text information of the subject file type, the working descriptor record 31a (FIG. 3b) has a first byte 91 which indicates the record type. In a preferred embodiment, a hex value of 01 in the first byte 91 indicates the record type to be that of an exact-match record. That is, information which is always consistently present in the file format being defined and which must be matched exactly in order to delimit the data. This information includes record descriptor characters, data delimiter characters, and record delimiter characters.

A hex value of 02 or 12 in the first byte 91 indicates that the record type is a "match-if-present" record. This includes information which may be present in the file format being defined. That is, this information might have variable length or be missing from some of the records of the file format being defined with this descriptor record type. This information is scanned on input, but ignored if no match is found. On output this information is written to the record as specified. Further, where one "match-if-present" character group follows another such character group, then the hex value of first byte 91 is toggled between hex 02 and 12.

The hex value for the first byte 91 of the record type is set to 04 to indicate a "skip-fixed" record. This is used for record information of constant length which is always present in the file format being defined, but record information which might change, though its length will remain the same. This information is ignored on input and the length of this data type is skipped to expedite processing. On output this information is written to the record as specified. An example of this type of component would be a format version number or a file creation date.

The next byte of working descriptor record 31a indicates the length of the text. And the following bytes 93 provide the subject text. In particular, the printable characters of the subject text (e.g., alphabetical characters and punctuation marks) are represented in ASCII character format, and non-printable characters (e.g., carriage return and line feed characters) are represented by a hex equivalent (e.g., 0X0D for carriage return and 0X0A for line feed character) as known in the art. Initially in the corresponding working file descriptions, carriage returns are indicated by 0D and line feed characters are indicated by 0A. Also the match-if-present characters of the subject text are enclosed in parenthesis. If the parenthesis character is used in the subject text, it is specified as a hex character or is preceded by a backslash. Any skip-fixed characters of the subject text are enclosed in square brackets. If the square bracket character is used in the subject text, it is represented by a hex character or is preceded by a backslash.

Figure 3C:
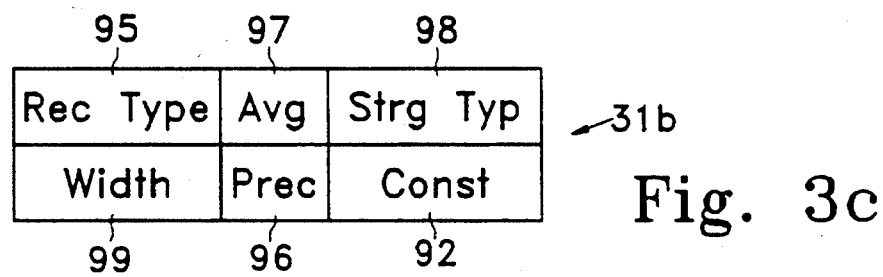

For a descriptor record 31b conveying Numeric information of the subject file type, the following record structure is employed as illustrated in FIG. 3c. The first byte 95 of the descriptor record 31b indicates the record type. A hex value of 09 indicates that the record type is a Numeric-Variable exact-match record. A hex value of 0A or 1A indicate that the record type is a Numeric-Variable match-if-present record and distinguishes between successive "match-if-present" character groups in series. A hex value of 0C indicates a record type of "Numeric-Variable Skip-Fixed".

Numeric-Variable information includes but is not limited to column number, row number, cell width, record length, number of rows, number of columns, etc. Initially in the corresponding working file descriptions, Numeric-Variable information generally has the format \argument±constant(width.precision, type)

where "±constant" and ".precision" are optional data; and "argument", "width" and "type" are as described below.

The next byte 97 holds a hex value for indicating the subject Numeric-Variable argument. In the preferred embodiment, the hex values of byte 97 and corresponding initial working file description Numeric-Variable arguments as found in subject file types are as follows.

| HEX | | Numeric-Variable Argument |
| --- | --- | --- |
| 01 | A | Beginning Column Number |
| 02 | B | Beginning Row Number |
| 03 | C | Ending Column Number |
| 04 | D | Ending Row Number |
| 05 | E | Total Column Count |
| 06 | F | Total Row Count |
| 07 | G | From Column Number |
| 08 | H | To Column Number |
| 09 | I | Integer Data Location |
| 0A | J | Justification Data Location |
| 0B | K | Label Text Location |
| 0C | L | Record Length |
| 0D | M | Data Record Length |
| 0E | N | Decimal Data Location |
| 0F | O | Occurrence or Repeat Count |
| 10 | P | Formula Numeric Location |
| 11 | Q | Formula Location |
| 12 | R | Formula Length |
| 13 | S | Text Data Location |
| 14 | T | Text Length |
| 15 | U | Field Type |
| 16 | V | Number of Decimal Positions |
| 17 | W | Cell Width |
| 18 | X | Current Column Number |
| 19 | Y | Current Row Number |
| 1A | Z | Date Data Location |
| 1B | a | Time Data Location |
| 1C | b | Current Worksheet Number |
| 1D | c | Mask Repeat Count |
| 1E | d | Reference Column |
| 1F | e | Reference Row |
| 20 | f | Reference Worksheet |
| 21 | g | Format Mask |
| 22 | h | Format Mask Index |

Arguments A through F are used in Range descriptor records 31, if the subject file type contains a range data record. Arguments G, H and W are used in Column Width descriptor records 31 to specify range of cells which use the width specified. Argument I is used in Integer descriptor records 31 to specify the location of the integer within the subject file type data record. Argument I is used in Text descriptor records 31 to specify the location of the text justification character (right, left, center) within the subject file type data record. Arguments S, T are used in Text descriptor records 31 to specify the location and length, respectively, of the text string within the subject file type data record.

Argument K is used in Label or Header descriptor records 31 to specify location of the text associated with the column or row label within the subject file type data record. Arguments L and M are used in descriptor records 31 for a stream file where each subject data record contains a record length indicator. Argument N is used in Decimal descriptor records 31 to specify location of the decimal within the subject file type data record. Argument O is used in Format descriptor records 31 to specify the number of times a portion of the subject file type data record will repeat data information.

Arguments P, Q, R are used in Formula descriptor records 31 to specify location of a formula within the subject file type data record. Argument U is used in a Data Type descriptor record 31 to specify location of a data type indicator. Argument V is used to specify the number of decimal places a numeric data item possesses.

Arguments X, Y, and b are used for subject file types related to spreadsheets. Specifically, Arguments X and Y are used in Data descriptor records 31 to define to which spreadsheet cell the data belongs. Argument b is used in Data descriptor records 31 to define to which worksheet the data belongs. Argument Z is used in Data descriptor records 31 to specify location of the data within a subject file type data record.

Argument a is used in Time descriptor records 31 to specify location of the time indication within a subject file type data record.

The next byte 98 of the descriptor record 31b (FIG. 3c) indicates the "type" character of the general numeric-variable format. This "type" character determines whether the associated argument is interpreted as a character, a string or a number, and whether it is stored in byte, word, double-word, short or long IEEE format. It is from this information that the column number format type 53, row number format type 63, record length format type 73 and cell width format type 83 bytes of the first portion 35 of associated description record 29 are defined as mentioned previously. The preferred hex values for byte 98 and corresponding Numeric-Variable "type" character and meanings used in the initial working file descriptions are as follows.

| HEX | | Numeric-Variable Type |
|---|---|---|
| 01 | C | One Byte Field |
| 02 | U | Unsigned One Byte Field |
| 03 | H | Two Byte Integer |
| 04 | W | Unsigned Two Byte Integer |
| 05 | L | Four Byte Integer |
| 06 | V | Unsigned Four Byte Integer |
| 07 | R | EXCEL 3.0 RK Unsigned Four Byte Number |
| 08 | J | Lotus Two Byte Floating Point Format |
| 09 | F | IEEE Floating-Point Format |
| 0A | D | IEEE Long Floating-Point Format |

-continued

| HEX | | Numeric-Variable Type |
|---|---|---|
| 0B | K | Ten Byte Floating-Point Format |
| 0C | Z | One Byte Character Logical |
| 0D | I | Integer in ASCII Format |
| 0E | N | Floating-Point ASCII Format |
| 0F | E | Scientific Notation, ASCII Format |
| 10 | B | Binary ASCII Format |
| 11 | O | Octal ASCII Format |
| 12 | Y | Date in 4-Digit Year, 2-Digit Month, 2-digit day indication (YYYYMMDD) ASCII Format. |
| 13 | X | Hexadecimal ASCII Format |
| 14 | S | Character String |

In byte 99 of the descriptor record 31b of FIG. 3c, the "width" of the Numeric-Variable information is indicated as a minimum number of characters. The "precision" of the Numeric-Variable information is indicated in byte 96 of descriptor record 31b. Preferably the value held by byte 96 is the maximum number of characters in a string (S type) or the number of digits to the right of the decimal point of a decimal (N type) number.

The last two bytes 92 of the descriptor record 31b indicate the Numeric-Variable constant. This constant specifies an offset other than default offsets. For example, if the first two bytes of a record contain the length of the record excluding those two bytes then the constant specifies −2 because the present invention interface 21 assumes that the length includes those bytes. As another example, if the lowest cell in a spreadsheet is located in position 1,1 then the constant specifies +1 for the X,Y variable because the interface 21 assumes that the first cell for that file type (i.e., spreadsheet) is located in position 0,0.

Figure 3D:
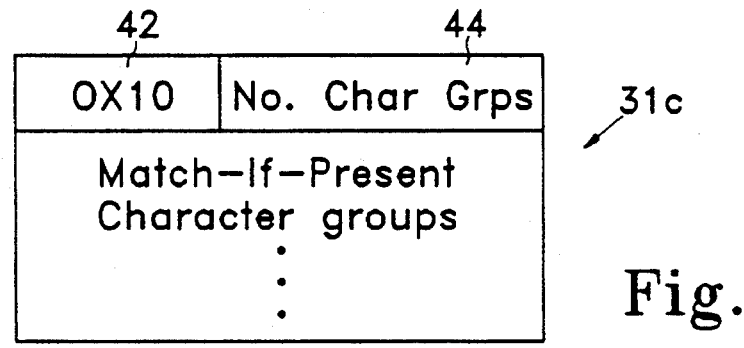

FIG. 3d illustrates a descriptor record structure for "skip-stop" records 31c. Stored in these types of records is information which helps to define when to ignore unrecognizable data. This information defines two or more (match-if-present) strings which are searched for. The closest "match-if-present" string found, relative to the start scanning position, causes the scanning position to ignore all data between the start scanning position and the found "match-if-present" string. On output, the first "match-if-present" string defined is written to the subject file type record as specified. Further, "skip-stop" characters are special components which end the "skip-many" components (described later).

Referring to FIG. 3d, the first byte 42 of descriptor record 31c holds the hex number "0X10" to indicate a skip-stop record. The second byte 44 holds the number of "match-if-present" character groups to scan for. The specific "match-if-present" character groups follow descriptor record 31c. In the corresponding initial working file descriptions, two or more "match-if-present" character groups are enclosed between angle brackets to specify the skip-stop character desired. If the angle bracket characters are used in the subject character group, they are represented by hex characters or they are proceeded by a backslash character. In sum, when the skip-stop record type is encountered, the interface 21 repositions the file pointer to the first "match-if-present" character it finds.

Figure 3E:

FIG. 3e illustrates a descriptor record 31d specifying a "skip-many" component. Such a component is used to indicate that the file format being defined may contain an unknown number of additional characters, in this position of the subject file type data record, which should be ignored on input. This is useful in cases where the "match-if-present" characters in a descriptor record 31 might not match the characters in the subject file type data records, in which case the present invention interface 21 skips to the next recognizable character. On output no characters are written to this position (indicated by the "skip-many" character) within the format file being defined from this information. Note, descriptor record 31d is always followed by "exact-match" or "skip-stop" information so the record matching mechanism of interface 21 knows when to stop skipping characters. That is, skip-many characters are a special case of the "match-if-present" character specifying that the rest of the characters should be skipped until the characters following the "skip-many" character are found. In the initial working file descriptions, a "skip-many" character is represented by three periods enclosed in parenthesis. If the parenthesis character is used in the subject file type data it is specified as a hex character or is preceded by a back slash character.

Referring to FIG. 3e the one byte long descriptor record 31d for a "skip-many" component holds the hex value OXFF to indicate the skip-many record type. Generally bytes that follow the record structure of FIG. 3e hold "exact-match" or "skip-stop" information.

Figure 3F:
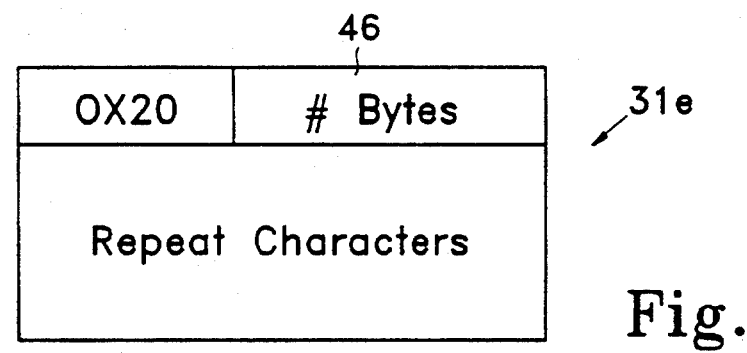

Referring to FIG. 3f is the record structure for a descriptor record 31e defining repeat records. That is, a group of "exact-match", "skip-fixed", or "variable-numeric" components which repeat within a subject file type data record is defined by descriptor records 31e of the type illustrated in the FIG. 3f. This type of component is used in Format descriptor records 31 where the field information may repeat for an unknown number of times depending on the number of fields defined for the specific file type. The repeat component group is preceded by an occurrence count or followed by a "skip-stop" component so the interface 21 knows when to stop searching for the repeated data.

As shown in FIG. 3f, the descriptor record 31e structure indicates in the first byte the repeat record type. In the preferred embodiment, that type is indicated by the hex value of 0X20. The next byte 46 indicates the number of following bytes which make up the repeated components. In the corresponding initial working file descriptions, the repeat characters are special components which repeat the "exact-match", "skip-fix", or "variable-numeric" components and are enclosed within curly brackets. If curly brackets are used in the repeat characters, they are represented in hex characters or are preceded by a backslash.

Non-limiting examples of initial working file descriptions used to generate descriptor record 31 contents for various table 23 entries are given in the attached Appendix. In each example, the corresponding file type is identified under the header "NAME", and descriptor records are identified in subheadings under the NAME header with initial working file descriptions for generating descriptor record information following each subheading. The working file descriptions following each subheading are an English interpretation of the binary code actually used in table 23 and includes the OD OA hex designation for carriage return, line feed characters; the parenthesis enclosure for match-if-present characters; the (...) symbol for skip-many characters; the square brackets enclosure about skip-fixed characters; the angle bracket enclosure about skip-stop characters; the curly bracket enclosure about repeat characters; and the Numeric-Variable general format detailed above in conjunction with FIGS. 3b-3f. As mentioned above, the Appendix entries are compiled by a table compiler to form the desired descriptor records 31 of table 23.

After table 23 has been defined and established according to the foregoing, operation of interface 21 utilizing table 23 in the preferred embodiment is implemented by the following software routines. More accurately, the following describes a group of file access subroutines which provide the functionality of interface 21.

By way of general overview, the present invention interface 21 allows applications 15 (FIG. 1) two options for data retrieval, and provides two writing mechanisms to write to a desired file. As to the two options for data retrieval, in one option interface 21 accesses a target file, parses the records of the file according to table 23, and passes the retrieved data back to the calling application 15 one cell or column at a time. In the second option, interface 21 accesses the target file, and passes any and all file records back to the calling application 15 one record at a time without parsing or extracting any of the data. In this instance, the calling application 15 needs to know the record structure of the target file and must parse retrieved records accordingly. This second option is a low level interface designed for applications 15 which need to know more information about the target file than simple data transfer.

In the preferred embodiment the former read option is accomplished by a routine called "DXgetcell" 107 (FIG. 4b), and the later read option is accomplished by a routine called "DXgetrec" 109 (FIG. 4c), both described below.

As to the writing mechanisms of interface 21, the first writing mechanism is implemented in a routine called "DXpcell". This routine accepts data one cell at a time and writes the data to the target file in the appropriate file format. The second writing mechanism allows the calling application 15 to insert records directly into the output file stream. These output records must already be formatted in a format familiar to the target output file type. This mechanism is generally only used when additional informational records, other than records currently produced and understood by table 23, are required for the type of file being output. This second writing mechanism is implemented by a routine called "DXputrec". These two write routines are described in detail later with reference to FIGS. 5a and b.

Figure 4A:
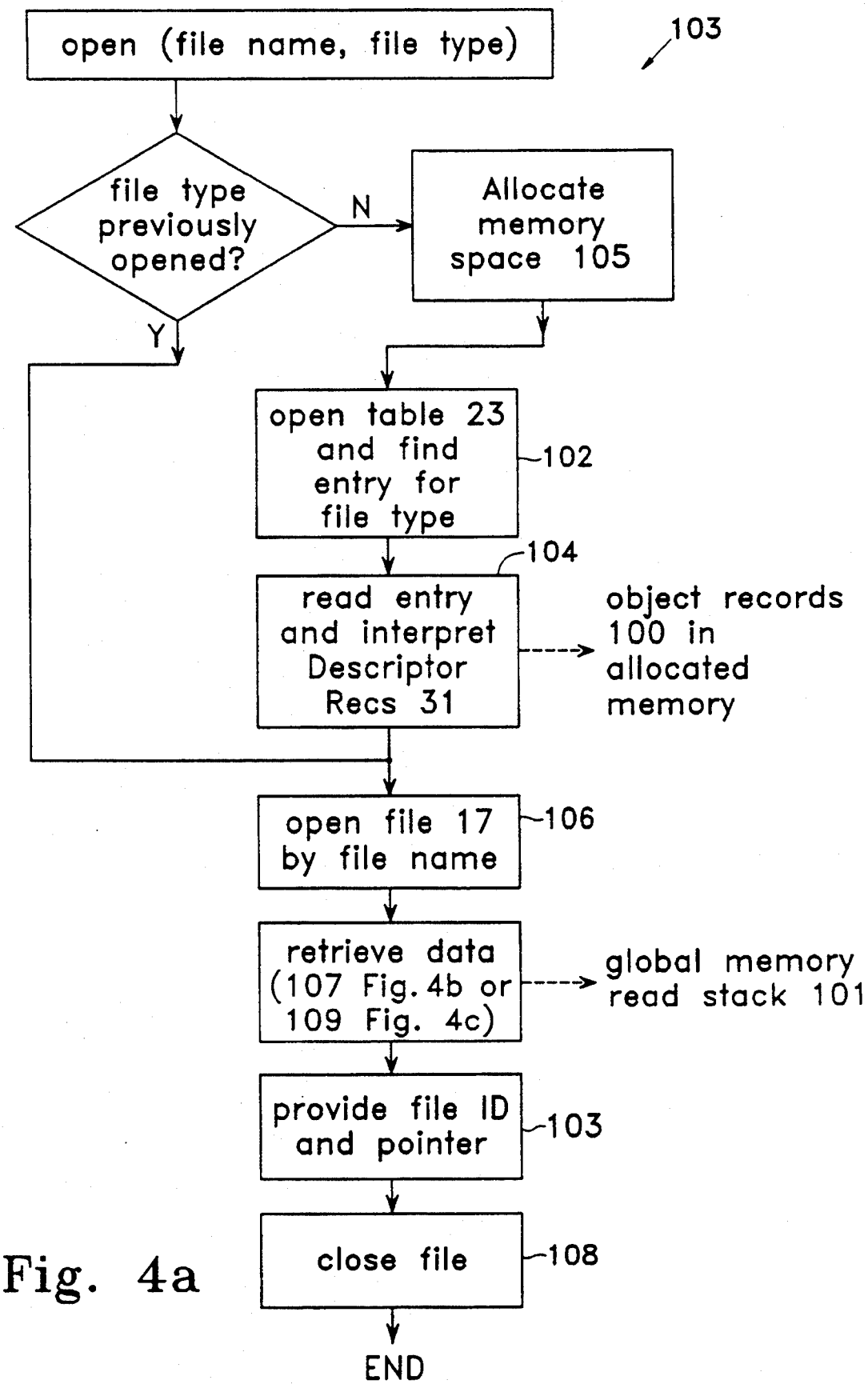
FIGS. 4a, 4b, and 4c are flow diagrams of the read operation of the embodiment of FIG. 1.

Referring to FIG. 4a data retrieval (read) operation 103 of interface 21 is illustrated. Before data can be accessed from a target file, the calling application 15 or user must open that file. This is accomplished by the calling application 15 initializing or freeing a global memory read stack 101 and issuing an "open" command to CPU 13 (FIG. 1). Specified in the "open" command is the file name of the desired target file 17 and the file type of that file. In response to the "open" command, interface 21 (via read operation 103) determines whether that file type has previously been opened. If that file type has previously been opened, the local memory space previously allocated and the internal structures previously generated are used.

If that file type has not previously been opened, interface 21 allocates local memory space 105. Then at 102 in FIG. 4a read operation 103 opens table 23 and searches for a table entry which maps to the designated file type of the desired file 17. Upon location of the table entry having a file type corresponding to the desired file type, read operation 103 (i.e., interface 21 at 104 in FIG. 4a)

reads that entry and interprets the descriptor records 31 specified under that entry. In interpreting descriptor records 31 of the corresponding file type, read operation 103 defines a set of object records 100 in the allocated memory space 105. The contents of these object records 100 specify the file format of the desired file type.

According to the file format as specified in the object records 100, interface 21 continues at step 106 of operation 103 by opening the desired file 17 by the given file name. Once the file 17 has been opened, the data contained in that file can be accessed and retrieved according to one of the two options of the present invention. Whatever option is used, the retrieved data is placed on a read stack 101 in global memory which was initialized by the calling application 15. In the preferred embodiment routine "DXgetcell" 107 is called to retrieve one cell/field at a time from the opened spreadsheet/database file 17. In particular, "DXgetcell" 107 accesses the opened file 17 and translates the records of that file using the object records 100 formed from the table 23 entry, and passes one cell of data at a time to the read stack 101 for reading by the calling application 15.

Alternatively, routine "DXgetrec" 109 is called to retrieve the desired data from the open file 17. That routine 109 accesses the file 17 in its native format, a record or cell at a time. In this case, the record or native cell is placed on the read stack 101 before it has been parsed, and the calling application 15 must parse the record to retrieve the data. As mentioned previously, this option is generally only used if the calling application 15 requires more information from a target file 17 than the cell content information which is returned through the DXgetcell 107 access method.

Further, on output from the retrieval of data, read operation 103 provides (i) a parameter for identifying the file 17 being accessed and object records 100 corresponding thereto, and (ii) a pointer to the read stack 101 on which the retrieved data is written.

When the open file 17 is no longer to be accessed, operation 103 may close the file 17 at 108 (FIG. 4a). In particular, read operation 103 writes to disk under the calling application 15 the retrieved data held on the read stack 101 and subsequently clears the read stack 101. This occurs namely in the case where CPU 13 runs out of memory, or the file 17 needs sorting. Further, this is accomplished according to the file format of calling application 15 so that a record and header are formatted on disk for the retrieved file data, the data is written into that format, and numbers or other special characters are properly converted for the calling application disk version of the retrieved data. The foregoing is done in accordance with the variable type and width specified in numeric variable information. of a descriptor record 31 of the calling application file type. Lastly, the stack pointer is moved as appropriate to reflect that the read stack 101 has been cleared.

Figure 4B:
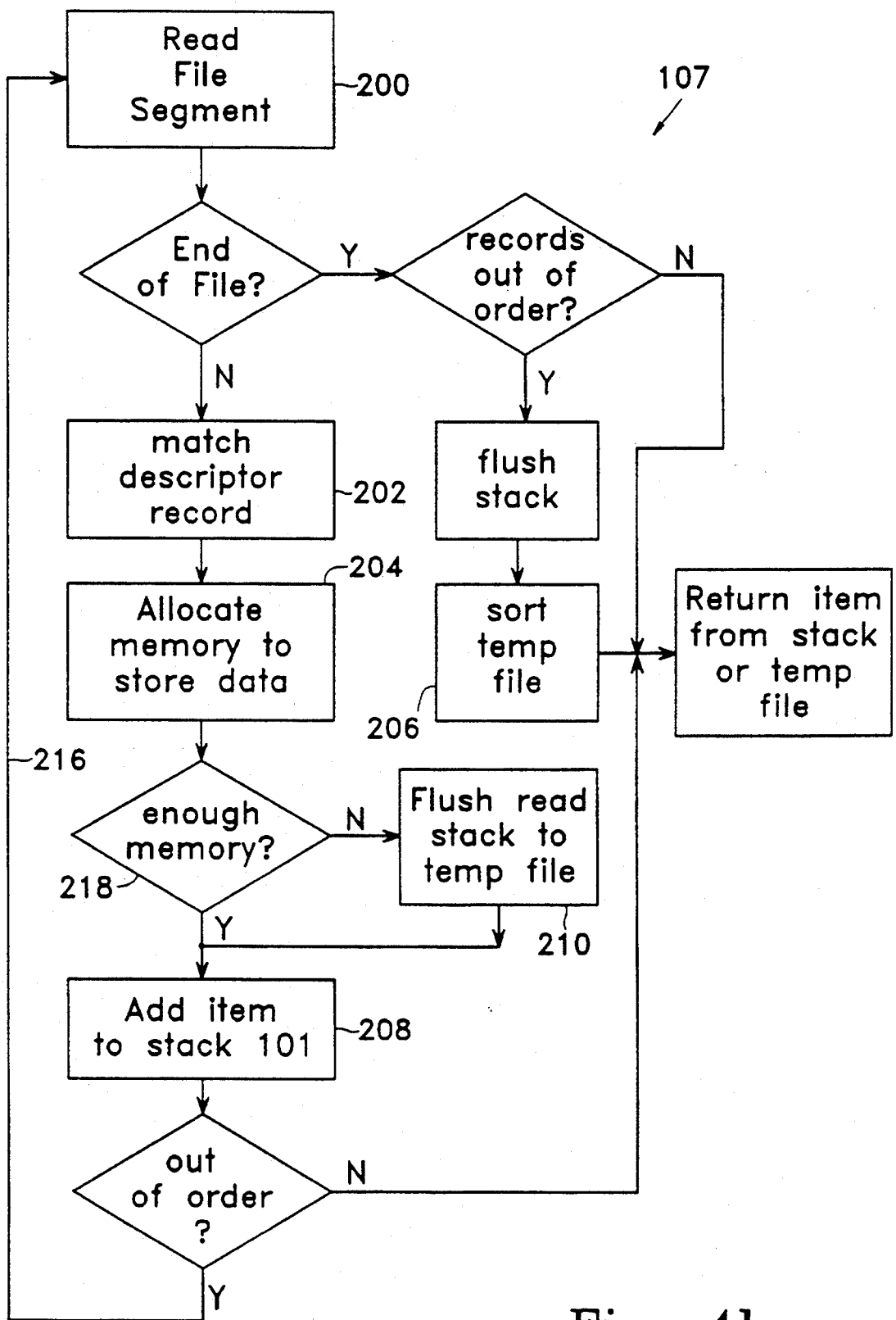

Illustrated in FIG. 4b is routine DXgetcell 107 in more particular terms. Routine 107 reads one file segment (step 200) at a time from open file 17. For each read file segment, DXgetcell 107 identifies the various parts composing that file segment. This is accomplished at step 202 by DXgetcell 107 mapping or matching file segment parts to descriptor record specified width, size and type of data portions according to object records 100.

Having identified the various parts, routine 107 allocates memory to store data at 204 and places the read data on read stack 101 at 208. Next routine 107 determines whether the cells of the open file 17 are stored in random order on file 17. If not, routine 107 returns the data placed on read stack 101 to the calling application. If routine 107 determines the data read from open file 17 is in random order i.e., cells of file 17 are stored/read out of order, then routine 107 reads the entire file 17 and sorts the read data before it actually passes the retrieved data back to the calling application via read stack 101. This is illustrated by loop 216 to step 206 in FIG. 4b, where sorting is preferably performed using a temporary file holding the read data.

At step 218, if read stack 101 is full or becomes full, routine 107 employs a backup file. The initial contents of read stack 101 are moved to the backup file (step 210) and future retrieved read data is placed on available read stack 101.

Figure 4C:
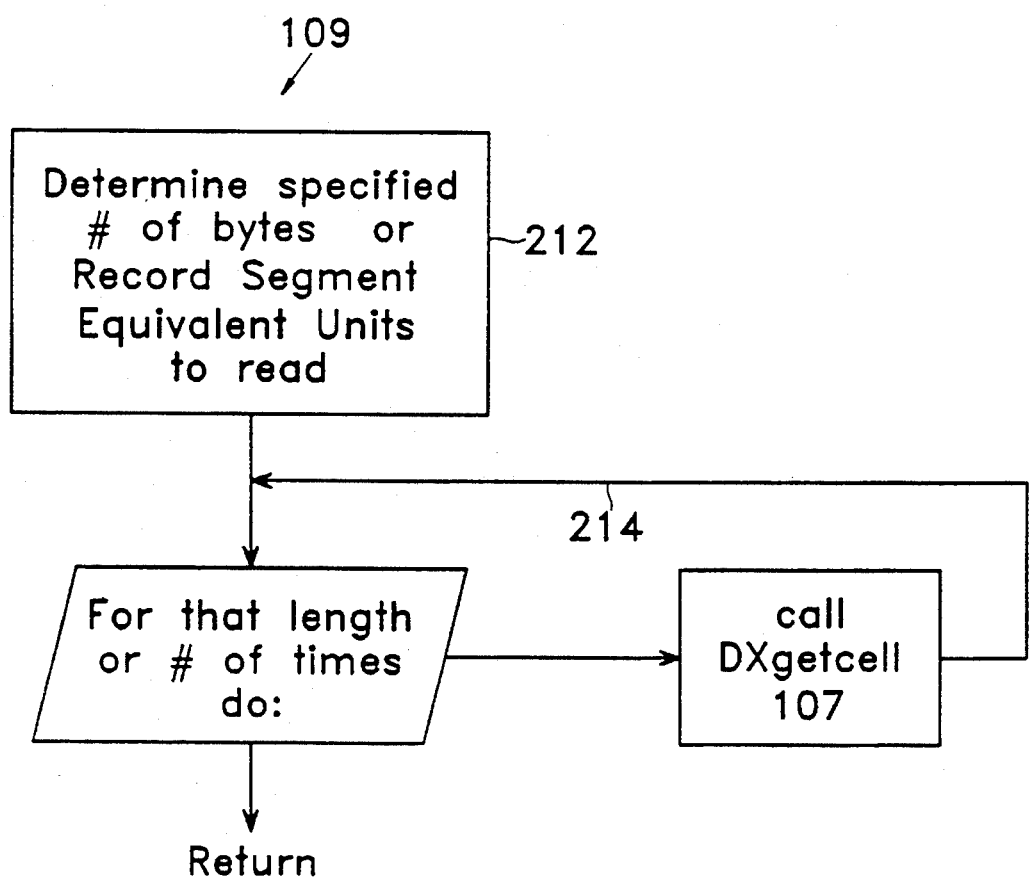

Referring to FIG. 4c, routine DXgetrec 109 is illustrated. If the user or calling application 15 specifies a desired number of units (i.e., bytes, file segments, or records) to be read from the opened file 17, read operation 103 calls routine 109 instead of routine 107.

First, step 212 of routine 109 receives and interprets the specified number of units desired to be read. In particular, at step 212, routine 109 establishes, in bytes or file record segment equivalent units, a working number of read accesses of open file 17 to make. Step 212 passes that working number to step 214.

Step 214 implements a loop for reading from open file 17 the working number of record segments/bytes. For each pass through the loop 214, one such record segment/byte is read from file 17 either directly or by a call to routine DXgetcell 107 described above in FIG. 4b. Specifically, if descriptor record information as represented by object records 100 is sufficient so that routine 109 at step 212 can determine what a "record" is, then loop 214 reads directly from open file 17 the appropriate number of bytes for that definition of record or record segment. Otherwise loop 214 calls routine 107, and cycles through loop 214 the working number of times. In this manner the working number or specified number of bytes are read from file 17 one at a time (i.e., until the working number of times has been counted).

Figure 5A:
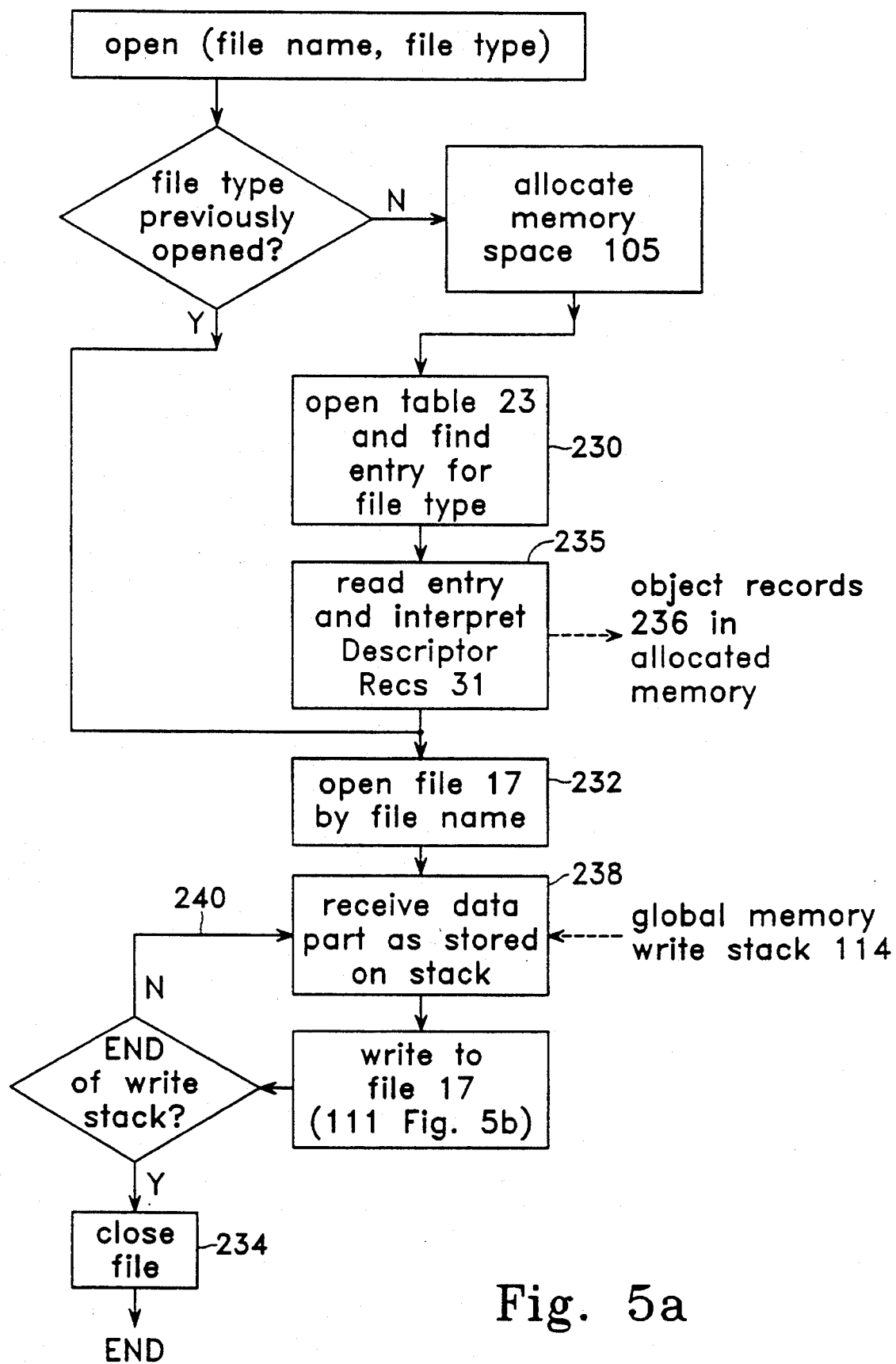
FIGS. 5a and 5b are flow diagrams of the write operation of the embodiment of FIG. 1.

Referring to FIG. 5a is a flow diagram of the write access operation 110 of interface 21. As in read operation 103, in order for a file to be written to, operation 110 first opens that file. This is accomplished by the user or calling application 15 initializing and freeing a global memory write stack 114, and issuing an "open" command to CPU 13 (FIG. 1). Specified in the "open" command is the file name of the desired target file 17 and the file type of that file. In response to the "open" command, interface 21, (via write operation 110) determines whether that file type has previously been opened. If that file type has previously been opened, the local memory space previously allocated and the internal structures existing therein are used.

If that file type has not previously been used, interface 21 allocates local memory space 105. Then at step 230 write operation 110 opens table 23 and searches for a table entry which maps to the designated file type of the desired file 17. Upon location of the table entry having a file type corresponding to the desired file type, write operation 110 (i.e., interface 21 at 235 in FIG. 5a) reads that entry and interprets descriptor records 31 specified under that table entry. In interpreting descriptor records 31 of the corresponding file type, write operation 110 defines a set of object records 236 in the allocated memory space 105. The contents of these object records 236 specify the file format for the file type of the desired file 17.

According to the file format as specified in the object records 236, interface 21 at step 232 of operation 110 opens the desired file 17 by the given file name. Once the file 17 has been opened, desired data may be written to that file. Data is received from the user or calling application 15 and stored on the global memory write stack 114. At step 238 of write operation 110 a data part is "popped" or received from the top of the write stack 114. That data part is then written to the opened file 17 according to one of the two write mechanisms provided by the present invention. The receipt of data parts from the top of write stack 114 and writing of that data part to open file 17 continues one data part at a time until the write stack 114 is emptied as indicated by the loop 240 in FIG. 5a.

When the open file 17 is no longer to be accessed, write operation 110 closes the file 17 at step 234 in FIG. 5a. In particular, write operation 110 writes to disk under the open file 17, the received data held on the write stack 114 which has not already been written thereto, and subsequently clears the write stack 114. This is accomplished according to the file format indicated in object records 236, so that a record and header are formatted on disk for the desired data, the data is written into that format, and numbers or other special characters are properly converted for the disk version of the received data. This is performed in accordance with the variable type and width specification in numerical variable information of a descriptor record 31 of the corresponding file type of open file 17. Lastly, the stack pointer is moved as appropriate to reflect that the write stack 114 has been cleared.

In the preferred embodiment, write operation 110 writes to open file 17 cells or records received by the calling application 15 or user by calling routine DXpcell 111. In general, routine DXpcell 111 accepts one cell of data at a time converts it according to the object records 236 reflecting the file type entry in table 23 and hence file format of file 17, and therefrom generates a record appropriate for the file type of file 17. Then routine 111 writes the generated record to the open file 17 on disk.

Figure 5B:
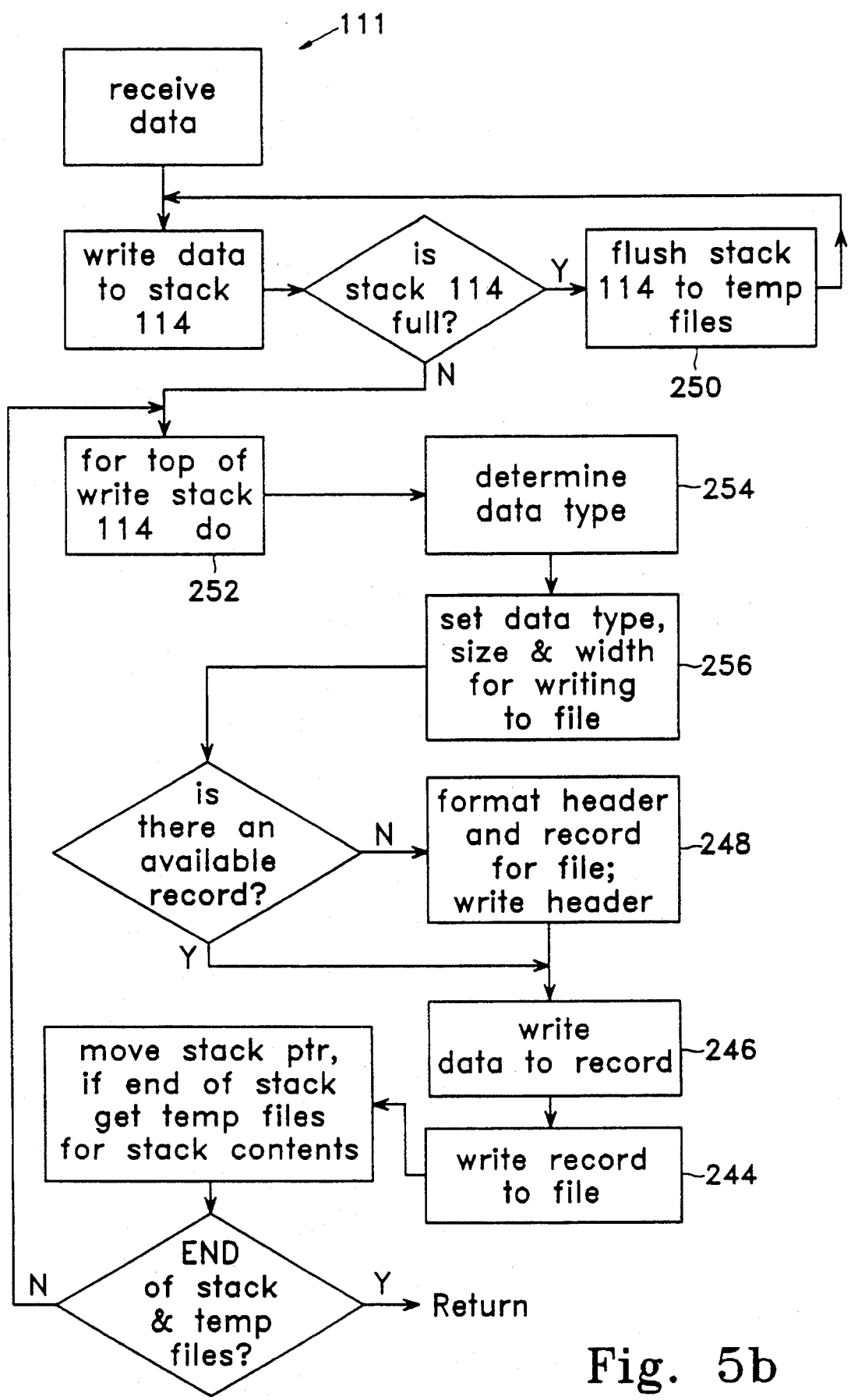

FIG. 5b illustrates the routine "DXpcell" 111 in more particular detail. Data to be written to the desired file 17 is received from the user or calling application 15 and stored on the write stack 114. If the write stack 114 becomes full, a procedure for moving the current contents of the write stack to a temporary scratch file is called at 250.

Next, at step 252 (FIG. 5b) DXpcell 111 performs the following for each data portion read from write stack 114, one portion at a time. First at 254 DXpcell 111 determines the data type of the data portion taken from the stack 114 (i.e., popped from the top of write stack 114). In addition, the type of that data portion, size and width are set at 256. As needed, numerical quantities are converted for writing to the open file 17.

As needed, the next step 248 formats a working header and record for the open file 17 according to the object records 236 specifying the file format from table 23. The header is also written to the formatted record. In turn, the data portion from the write stack 114 is written to the formatted working record 246. Ultimately, the working record is written to the open file 17 at step 244 (FIG. 5b). Subsequently, the write stack pointer is moved to the next portion of the data to be read from the stack 114.

The foregoing steps are repeated for each data portion read from write stack 114 and temporary files used to store the subject data. In the case where a data portion is read from a temporary file, step 248 formatting the record to be written to the open file 17 also determines whether the subject data is from the current write stack 114 or a temporary file. When all temporary files and stack 114 are empty and hence all desired data has been written to open file 17, routine 111 returns to write operation 110 at the end of loop 240 in FIG. 5a.

Alternative to routine 111, write operation 110 uses the optional writing mechanism mentioned above. This involves operation 110 accepting a record of desired data at a time from the calling application 15 or user, and writing the received record or specified number of bytes directly to the open file 17 (i.e., to disk).

In addition to read, write access, table 23 is used for file type recognition. In particular, calling application 15 may issue a command "DXfiletype". This routine determines the format of the specified target file and returns an indication of the file format to the calling application 15. More specifically, a command "DXfiletype" is a call to the CPU 13 to open the specified target file 17, and using table 23 look at the open file to figure out the file type. In order for the CPU 13 to open the file 17, this command asks the CPU 13 to open files for all file types it knows. From the CPU list of all of its file types, the DXfiletype routine figures out the closest matching file type from table 23.

Equivalents

While the invention has been particularly shown and described with reference to a preferred embodiment thereof, it will be understood by those skilled in the art that various changes in form and details may be made therein without departing from the spirit and scope of the invention as defined by the appended claims.

APPENDIX

Example Descriptor Record Entries for Given File Type

Example 1 DOS 20/20 File

NAME DS2020

| | |
|---|---|
| EOR_RECORD | ## \0D \0A |
| DATA_DELIMITER | # |
| DECIMAL_RECORD | \N(1.16,N) |
| TEXT_RECORD | <( \J(1,S) \S(1.255,S)) ( \S(1.255,S))> |
| INTEGER_RECORD | \I(1,I) |
| EMPTY_CELL_RECORD | \20 |
| LEFT_JUSTIFY | ' |
| RIGHT_JUSTIFY | " |
| REPEAT_CHAR | \\ |
| PC_FILE | 1 |
| INSERTABLE | 1 |
| DEFAULT_COLUMN_WIDTH | 9 |
| CHARACTER_SET | 3 |

END

Example 2 VS 20/20 File

NAME VS2020

| | |
|---|---|
| EOR_RECORD | ## |
| DATA_DELIMITER | # |
| DECIMAL_RECORD | \N(1.16,N) |
| TEXT_RECORD | <( \J(1,S) \S(1.255,S)) ( \S(1.255,S))> |
| INTEGER_RECORD | \I(1,I) |
| EMPTY_CELL_RECORD | \20 |
| LEFT_JUSTIFY | ' |
| RIGHT_JUSTIFY | " |
| REPEAT_CHAR | & |
| PC_FILE | 0 |

APPENDIX-continued
Example Descriptor Record Entries for Given File Type

|   |   |
|---|---|
| VS_FIXED | 0 |
| VS_COMPRESSED | 0 |
| VS_RECORD_LENGTH | 80 |
| INSERTABLE | 1 |
| DEFAULT_ | 9 |
| COLUMN_WIDTH | |
| CHARACTER_SET | 2 |
| END | |

Example 3 VS Consecutive File
| NAME VSCONS | |
|---|---|
| RECORD_FORMAT | L−2(2,H)(...) |
| TEXT_RECORD | L−2(2,H){ S(1,S)} |
| PC_FILE | 0 |
| VS_FIXED | 0 |
| VS_COMPRESSED | 0 |
| VS_RECORD_LENGTH | 80 |
| INSERTABLE | 1 |
| CHARACTER_SET | 2 |
| END | |

Example 4 DBASE File
| NAME DBASE | |
|---|---|
| TEXT_RECORD | \20\ S(1,S) |
| EOF_RECORD | \1A |
| FORMAT_RECORD | <(\03)(\83)(\43)>[\58\01-01]\F(4,L)\L(2,H)\M(2,H)[\0\0-\0\0\0\0\0\0\0\0\0\0\0\0\0-\0\0\0\0\0]{\K(10,10,S)\0\U(1,C)[\0\0\0-\0]\T(1,C)\V(1,C)[\0\0\0\0\0-\0\0\0\0\0\0\0\0\0\0\0]}\0D |
| DATA_TYPES | ,,,,,,,,,L,,N,,,,D,C |
| PC_FILE | 1 |
| INSERTABLE | 1 |
| CHARACTER_SET | 3 |
| RECORD_LENGTH | 4000 |
| COLUMN_LIMIT | 512 |
| END | |

Example 5 Delimited Text File
| NAME DELIM | |
|---|---|
| DATA_DELIMITER | , |
| DECIMAL_RECORD | \N(1.16,N) |
| TEXT_RECORD | (\J(1,S)\S(1,S)\J(1,S)) |
| EOR_RECORD | \0D\0A |
| INTEGER_RECORD | \I(1,I) |
| LEFT_JUSTIFY | " |
| PC_FILE | 1 |
| INSERTABLE | 1 |
| DEFAULT_ | 1 |
| COLUMN_WIDTH | |
| CHARACTER_SET | 3 |
| END | |

Example 6 DIF File
| NAME DIF | |
|---|---|
| TEXT_RECORD | 1,0 \0D\0A\J(1,S)\S(1.255,S)\J(1,S)\0D\0A |
| DECIMAL_RECORD | 0,\N(1.16,N)\0D\0AV\0-D\0A |
| HEADER_RECORD | TABLE \0D\0A0,1\0D\0A"(...)"\0D\0A |
| RANGE_RECORD | VECTORS \0D\0A0,\E(1.3,I)\0D\0A""\0D\0A TUPLES \0D\0A0,\F(1.3,I)\0D\0A""\0D\0A |
| BOD_RECORD | DATA \0D\0A0,0\0-D\0A""\0D\0A |
| BOR_RECORD | −1,0\0D\0ABOT\0D\0A |
| EOF_RECORD | −1,\0D\0AEOD\0D\0A |
| INTEGER_RECORD | 0,\I(1,I)\0D\0AV\0D\0A |
| DATE_RECORD | 0,\S(1.255,S)\0D\0AV\0-D\0A |
| LEFT_JUSTIFY | " |
| PC_FILE | 1 |
| INSERTABLE | 1 |
| DEFAULT_ | 9 |
| COLUMN_WIDTH | |
| WRITE_ORDER | HEADER_RECORD, RANGE_RECORD, BOD_RECORD |
| CHARACTER_SET | 3 |
| END | |

Example 7 EXCEL Files
| NAME EXCEL | |
|---|---|
| VERSION_START | 02.00.00 |
| RECORD_FORMAT | \00\00\L−4(2,H)(...) |
| TEXT_RECORD | \04\00\L−4(2,H)\Y(2,H)-\X(2,H) [\40\0\0]\T(1,U)\S(1.255,S) |
| DATE_RECORD | \02\0C\09\00\Y(2,H)\X(-2,H) [\40]<(\0C)(\0D)(\0F)(\4-C)(\4D)(\4E)(\4F)(\8C)(\8D)(\8E)(\8F)(\CC)(\CD)-(\CE)(\CF)>[\0]\Z(2,W) |
| INTEGER_RECORD | \02\00\09\00\Y(2,H)\X(-2,H) [\40\0\0]\I(2,H) |
| TIME_RECORD | \03\00\0F\00\Y(2,H)\X(-2,H) [\40]<(\10)(\11)(\12)(\13)(\14)(\50)(\51)(\52)(\53)(-\54)(\90) (\91)(\92)(\93)(\94)(\D0)(-\D1)(\D2) (\D3)(\D4)>[\0]\a(8,D) |
| DECIMAL_RECORD | \03\00\0F\00\Y(2,H)\X(-2,H) [\40\0\0]\N(8,D) |
| EMPTY_CELL_RECORD | \01\00\07\00\Y(2,H)\X(-2,H) [\40\0\0] |
| EOF_RECORD | \0A\00\00\00 |
| HEADER_RECORD | \09\00\04\00[\02\00]\1-0\00 |
| EXTRA_1 | \06\00\L−4(2,H)\Y(2,H)-\X(2,H) [\40]<(\10)(\11)(\12)(\13)(\14)(\50)(\51)(\52)(\53)(-\54)(\90) (\91)(\92)(\93)(\94)(\D0)(-\D1)(\D2) (\D3)(\D4)>[\0]\a(8,D) [\0]\R(1,C)(\Q(0,S) |
| EXTRA_2 | \06\00\L−4(2,H)\Y(2,H)-\X(2,H) [\40]<(\0C)(\0D)-(\0E)(\0F) (\4C)(\4D)(\4E)(\4F)(\8C-)(\8D) (\8E)(\8F)(\CC)(\CD)(\C-E) (\CF)>[\0]\Z(8,D)[\0]\R(1,C)\Q(0,S) |
| FORMULA_RECORD | \06\00\L−4(2,H)\Y(2,H)-\Z(2,H) [\40\0\0]\P(8,D)\R(1,C)-\Q(0,S) |
| RANGE_RECORD | \00\00\08\00\B(2,H)\D-+1(2,H)\A(2,H)\C+1(2,H) |
| EXTRA_3 | \07\00\L−4(2,H)\T(1,U)-\S(1.255,S) |
| PASSWORD | \2F\00\L−4(2,H) |
| PC_FILE | 1 |
| INSERTABLE | 0 |
| DEFAULT_ | 9 |
| COLUMN_WIDTH | |
| CHARACTER_SET | 1 |
| WRITE_ORDER | HEADER_RECORD, RANGE_RECORD |
| VERSION_END | |
| VERSION_START | 03.00.00 |
| RECORD_FORMAT | \00\00\L−4(2,H)(...) |
| TEXT_RECORD | \04\02\L−4(2,H)\Y(2,H)-\X(2,H) |

APPENDIX-continued
Example Descriptor Record Entries for Given File Type

| | | |
|---|---|---|
| DECIMAL_RECORD | | [\0\0]\T(2,H)\S(1.255,S)\03\02\0E\0-0\Y(2,H)\X(2,H) |
| EMPTY_CELL_RECORD | | [\0\0]\N(8,D)\01\02 06\00\Y(2,H)\X(-2,H)[\0\0] |
| EOF_RECORD | | \0A\00\00\00 |
| HEADER_RECORD | | \09\02\6\0[\0\0]\10\0[-\0\0] |
| FORMULA_RECORD | | \06\02\L−4(2,H)\Y(2,H)-\X(2,H)[\0\0]\P(8,D)[\01\00]\R(-2,H)\Q(0,S) |
| RANGE_RECORD | | \00\02\0A\00\B(2,H)\D-+1(2,H)\A(2,H)\C+1(2,H)[\00-\00] |
| EXTRA_1 | | \07\02\L−4(2,H)\T(2,H)-\S(1.255,S) |
| EXTRA_2 | | \7E\02\0A\0-0\Y(2,H)\X(2,H)[\00\00]\N(4,R) |
| PASSWORD | | \2F\00\L−4(2,H) |
| BOD_RECORD | | \8\2\10\0[\0\0\0\0\1-\0\ff\0\0\0\0\0\0\0\0-\0\0] |
| PC_FILE | | 1 |
| INSERTABLE | | 0 |
| DEFAULT_COLUMN_WIDTH | | 9 |
| CHARACTER_SET | | 1 |
| WRITE_ORDER | | HEADER_RECORD, RANGE_RECORD, BOD_RECORD |
| VERSION_END | | |
| END | | |

Example 8 SYLK File
NAME SYLK

| | | |
|---|---|---|
| TEXT_RECORD | | C;<(Y\Y+1(1,I);X\X+1(1,I);)(X\X+1(1,I);Y\Y+1(1,I);)(Y\Y+1(1,I);)(X\X+1(1,I);)>(...)<(K\J(1,S)\S(1.255,S)\J(1,S))(S)>(...)\0D\0A |
| DECIMAL_RECORD | | C;<(Y\Y+1(1,I);X\X+1(1,I);)(X\X+1(1,I);Y\Y+1(1,I);)(Y\Y+1(1,I);)(X\X+1(1,I);)>(...)<(K\N(3.1,N))(S)>(...)\0-D\0A |
| EOF_RECORD | | E\0D\0A |
| COL_WIDTH_RECORD | | F(...)<(;W\G+1(1,I)\20\H+1(1,I)\W(1,I));Y\Y+1(1,I);X\X+1(1,I));X\X+1(1,I);Y\Y+1(1,I));Y\Y+1(1,I));X/X+1(1,I))(\0D\0A)> |
| RANGE_RECORD | | B;<(Y\F(1,I);X\E(1,I))(X\E(1,I);Y\F(1,I))>(...)(\0-D\0A |
| HEADER_RECORD | | ID;P(INFOSHAR)(...)(\0D\0A |
| EXTRA_1 | | (...)\0D\0A |
| INTEGER_RECORD | | C;<(Y\Y+1(1,I);X\X+1(1,I);)(X\X+1(1,I);Y/Y+1(1,I);)(Y\Y+1(1,I);)(X\X+1(1,I);)>(...)<(K\I(1,I))(S)>(...)\0D\0A |
| LEFT_JUSTIFY | | " . |
| REPLACEMENT_1 | | ;;; |
| REPLACEMENT_2 | | "' |
| PC_FILE | | 1 |
| INSERTABLE | | 1 |
| DEFAULT_COLUMN_WIDTH | | 9 |
| CHARACTER_SET | | 3 |
| WRITE_ORDER | | HEADER_RECORD, RANGE_RECORD, COL_WIDTH RECORD |
| ROW_LIMIT | | 4096 |
| COLUMN_LIMIT | | 63 |
| OUT_OF_ORDER | | 1 |
| END | | |

Example 9 TEXT File
NAME DOSTXT

| | | |
|---|---|---|
| EOR_RECORD | | <(\0D\0A)(\0C)> |
| EOF_RECORD | | \1A |
| DECIMAL_RECORD | | \N(1.16,N) |
| TEXT_RECORD | | \S(1,S) |
| INTEGER_RECORD | | \I(1,I) |
| PC_FILE | | 1 |
| INSERTABLE | | 1 |
| DEFAULT_COLUMN_WIDTH | | 1 |
| CHARACTER_SET | | 3 |
| END | | |

Example 10 Worksheet File
NAME 1-2-3

| | | |
|---|---|---|
| VERSION_START | | 02.00.00 |
| RECORD_FORMAT | | \00\00\L−4(2,H)(...) |
| EXTRA_1 | | \0D\00\07\00<(\F9)(\F2)(\F3)(\F4)(\FA)(\72)(\73)-(\74)(\79)(\7A)>\X(2,H)\Y(2,H)\Z(2,W) |
| INTEGER_RECORD | | \0D\00\07\00[\FF]\X(2,H)\Y(2,H)\J(2,I) |
| DATE_RECORD | | \0E\00\0D-\00<(\F9)(\F2)(\F3)(\F4)(\FA)(\72)(\73)-(\74)(\79)(\7A)>\X(2,-H)\Y(2,H)\Z(8,D) |
| TIME_RECORD | | \0E\00\0D-\00<(\FB)(\F7)(\F8)(\FC)(\77)(\78)(\7B)(-\7C)>\X(2,H)\Y(2,H)\a(8,D) |
| DECIMAL_RECORD | | \0E\00\0D\00[\FF]\X(2,H)\Y(2,H)\N(8,D) |
| TEXT_RECORD | | <(\0F)(\33)>\00\L−4(2,H)[\FF]\X(2,H)\Y(2,H)\J(1,S)\S(1.240,S)\00 |
| EXTRA_2 | | \10\00\L−4(2,H)<(\F9)(\F2)(\F3)(\F4)(\FA-)(\72)(\73)(\74)(\79)(\7A)>\X(2,H)\Y(2,H)\P(8,D)\R(2,H)\Q(0,S) |
| EXTRA_3 | | \10\00\L−4(2,H)<(\FB)(\F7)(\F8)(\FC)(\77-)(\78)(\7B)(\7C)>\X(2,H)\Y(2,H)\P(8,D)\R(2,H)\Q(0,S) |
| FORMULA_RECORD | | \10\00\L−4(2,H)[\FF]\X(2,H)\Y(2,H)\P(8,D)\R(2,H)\Q(0,S) |
| EMPTY_CELL_RECORD | | \0C\00\05\00[\FF]\X(2,-H)\Y(2,H) |
| EOF_RECORD | | \01\00\00\00 |
| HEADER_RECORD | | \00\00\02\00<(\06)(\05)-(\04)>\04 |
| RANGE_RECORD | | \06\00\08 \00\A(2,H)\B(-2,H)\C(2,H)\D(2,H) |
| COL_WIDTH_RECORD | | \08\00\03\00\X(2,H) \W(-1,U) |
| PASSWORD | | \4B\00\L−4(2,H) |
| LEFT_JUSTIFY | | ' |
| CENTER | | ∧ |
| RIGHT_JUSTIFY | | " |
| REPEAT_CHAR | | \\ |
| PC_FILE | | 1 |
| INSERTABLE | | 0 |
| DEFAULT_COLUMN_WIDTH | | 9 |
| CHARACTER_SET | | 4 |
| COLUMN_LIMIT | | 256 |
| ROW_LIMIT | | 8192 |

APPENDIX-continued

Example Descriptor Record Entries for Given File Type

| | |
|---|---|
| WRITE_ORDER | HEADER_RECORD, RANGE_RECORD, COL_WIDTH RECORD |
| VERSION_END | |
| VERSION_START | 03.00.00 |
| RECORD_FORMAT | \00\00\L−4(2,H)\(...) |
| DECIMAL_RECORD | <(\17\00\0E\00\Y(2,H) b(1;U)\X-(1,U)\N(10,K)(\18\00 \06\00\Y(2,H)\b(1,U)\X-(1,U) \N(2,J))> |
| TEXT_RECORD | <(\16\0\L−4(2,H)\Y(2,H) b(1,U)\X(1,U)\J(1,S))-(\1A\00\L−4 (2,H)\Y(2,H)\b(1,U)\X(1,U) \S(0,S)\00) |
| FORMULA_RECORD | \19\00\L−4(2,H)\Y(2,H) \b(1,U)\X-(1,U)\P(10,K)\Q(0,S) |
| EOF_RECORD | \01\00\00\00 |
| HEADER_RECORD | \00\00\1A\00\00\10\04-\00\B(2,H) ≈[\0]\A(1-,U)\D(2,H)[\0]\C(1,U) [\0\0\0\0\1\2\0\0\0-\0\0\0\0\0] |
| RANGE_RECORD | \04\00\1C\00[\1\1\1-\0\0\0\7\14\48\4\4\0-\0\0 \0\0\0\0\0\0\0\0-\0\0\0\0\0] |
| COL_WIDTH_RECORD | \07\00\L−4(2,H)[\0\0\0-\0]{\X(1,U)\W(1,C)} |
| PASSWORD | \02\00\L−4(2,H) |
| LEFT_JUSTIFY | ' |
| CENTER | ^ |
| RIGHT_JUSTIFY | " |
| REPEAT_CHAR | \ |
| PC_FILE | 1 |
| INSERTABLE | 0 |
| DEFAULT_COLUMN_WIDTH | 9 |
| CHARACTER_SET | 4 |
| COLUMN_LIMIT | 256 |
| ROW_LIMIT | 8192 |
| WRITE_ORDER | HEADER_RECORD, RANGE_RECORD, COL_WIDTH RECORD |
| END VERSION | |

I claim:

1. In a digital processor having (i) a storage memory holding a plurality of files of different file formats and (ii) a multiplicity of different applications executable in main memory, a method of accessing files of different formats comprising the steps of;
   providing a single table stored in working memory of the digital processor for indicating component parts of different file formats, the table having a different entry for each of different file formats but a set of common representations used in each entry for indicating component parts of respective file formats;
   coupling processor means to the table for interfacing between at least one application and files of different formats in the storage memory; and for a desired file having a respective file format foreign to a subject application, operating the processor means including (a) accessing the entry of the table corresponding to the file format of the desired file, (b) parsing the desired file into the component parts indicated in the table entry according to the set of common representations used for indicating the component parts of the file format of the desired file, and (c) assembling the component parts into the file format of the subject application as indicated in the table in terms of the set of common representations to provide access of the desired file by the subject application, for different file formats, the processor means accessing the same table but different entries thereto, but a set of common representations used in each entry for indicating component parts of respective file formats.

2. A method as claimed in claim 1 wherein the step of providing a table includes providing cross references in the table which cross reference each of different file formats according to a different file type, different files of the digital processor each being assigned a respective file type.

3. A method as claimed in claim 1 wherein the different file formats include a spreadsheet format.

4. In a digital processor having (i) a storage memory holding a plurality of files of different file formats and (ii) a multiplicity of different applications executable in main memory, computer apparatus comprising:
   a single table stored in working memory of the digital processor for indicating component parts of different file formats, the table having a different entry for each of different file formats but a set of common representations used in each entry for indicating component parts of respective file formats; and
   processor means coupled to the table for interfacing between at least one application and files of different formats in the storage memory, for a desired file having a respective file format foreign to a subject application, the processor means (a) accessing the entry of the table corresponding to the file format of the desired file, (b) parsing the desired file into the component parts indicated in the table entry according to the set of common representations used for indicating the component parts of the file format of the desired file, and (c) assembling the component parts into the file format of the subject application as indicated in the table in terms of the set of common representations to provide access of the desired file by the subject application, the processor means accessing the same table but different entries to the table for different file formats, each entry using the set of common representations for indicating component parts of respective file formats.

5. Computer apparatus as claimed in claim 4 wherein the table cross reference each of different file formats according to a different file type, different files of the digital processor each being assigned a respective file type.

6. Computer apparatus as claimed in claim 4 wherein the different file formats include a spreadsheet format.

* * * * *